United States Patent [19]

Golightly et al.

[11] 4,019,916

[45] Apr. 26, 1977

[54] AIR ENTRAINING AGENTS

[75] Inventors: David Stainsley Golightly; Allan Onions, both of Whitehaven, England

[73] Assignee: Albright & Wilson Limited, Warley, England

[22] Filed: May 5, 1975

[21] Appl. No.: 574,398

[30] Foreign Application Priority Data

May 5, 1974 United Kingdom ............... 3766/74

[52] U.S. Cl. .............................. 106/88; 166/31 H
[51] Int. Cl.$^2$ ......................................... C04B 7/35
[58] Field of Search ............... 106/86, 87, 88, 31 H

[56] References Cited

UNITED STATES PATENTS 3,029,250 4/1962 Gaertner .............................. 106/86
3,537,869 11/1970 Proell ................................. 106/86

*Primary Examiner*—J. Poer
*Attorney, Agent, or Firm*—Flynn & Frishauf

[57] ABSTRACT

It is known to mix cement, mortar and the like in the presence of an air entraining agent. According to the invention a water soluble sulphosuccinamate is employed as the air entraining agent. A particularly preferred air entraining composition is provided comprising a water soluble sulphosuccinamate, a water soluble sulphosuccinate and a water soluble alkyl benzene sulphonate.

11 Claims, No Drawings

AIR ENTRAINING AGENTS

The present invention relates to air entraining agents for cement based building materials. It is usual practice to add air entraining agents to cement based mixes such as concrete and mortar, in order to entrain microscopic bubbles of air in the mixture. This imparts certain advantages to the concrete or mortar. Firstly it plasticises the mix, making it more workable, and in this respect the entraining agent often acts as a replacement, at least in part, for lime. Secondly, when the concrete or mortar sets the entrained bubbles increase its elasticity, its resistance to salt solutions and above all, its resistance to frost damage.

Most of the materials proposed hitherto for use as air entraining agents have suffered from the serious disadvantage that if they are not used under optimum conditions e.g. if the dosage of mixing time is excessive there is a grave risk of entraining too much air and so weakening the product. It is extremely difficult, in practice, to ensure that such departures from optimum mixing conditions do not occur. Certain materials are known, based on a natural resin, which cause rapid entrainment of air during the initial mixing period, until the amount of air entrained reaches a level determined by the amount of entraining agent present, and thereafter the rate of further entrainment is very slow. Consequently these resin based materials greatly reduce the risk of over-mixing, and, moreover, are less sensitive to overdosing.

We have now discovered that a particular group of synthetic materials exhibit closely similar mixing properties to the natural resin based material used hitherto. The resemblance is sufficiently close to permit the former to be widely acceptable as replacement for the latter.

Our invention provides, according to one embodiment, a method of making aerated cement based building materials, which comprises using as the air entrainment agent therein, a water soluble sulphosuccinamate.

The sulphosuccinamate has the formula RNHCOCH(SO$_3$M)CH$_2$COOM or RNHCOCH$_2$CH(SO$_3$M)COOM wherein R is preferably a saturated or unsaturated hydrocarbon group having at least 4, preferably 8 to 22, e.g., 12 to 18, or 10 to 14 carbon atoms, especially 12 carbon atoms, or an alkylalkoxy, alkylpolyalkoxy alkenylalkoxy or alkenylpolyalkoxy group wherein the alkyl or alkenyl moiety has at least 4, e.g. 8 to 22 preferably 10 to 14 carbon atoms, the alkoxy group is preferably ethyleneoxy and the group preferably contains an average of 1 to 20 alkyleneoxy moieties, e.g. 3 to 7 most preferably 3 to 6, and each M is preferably alkali metal, ammonium or an organic base. The "M's" may be the same or different.

R may for example be a cocoyl, lauryl, stearyl, oleyl or octyl group or a dodecyltriethyleneoxy group or myristylpoly ethyleneoxy group. M may for example be lithium, sodium, potassium, ammonium or a mono- di- tri- or quaternary-alkyl ammonium group, e.g. R$_1$NH$_3$, R$_1$R$_2$NH$_2$, R$_1$R$_2$R$_3$NH, R$_1$R$_2$R$_3$R$_4$N, in which R$_1$, R$_2$, R$_3$, R$_4$ may be any combination of C$_1$ to C$_6$ alkyl groups, such as, a tetramethyl ammonium, diethylammonium, triethyl ammonium monomethyl ammonium, dimethyl dipropylammonium or tributylammonium groups, or an alkylamine or alkanolamine or derivative.

Typical examples of suitable salts include diammonium cocoyl sulphosuccinamate, disodium stearyl sulphosuccinamate and potassium ethanolamine oleylsulphosuccinamate.

A problem which we have encountered when sulphosuccinamates are used as aforesaid is the comparatively low solubility of certain of the sulphosuccinamates in water and the undesirably low stability of the solutions, which sometimes results in the solid separating out of the solution in cold weather.

We have discovered that sulphosuccinamates and certain other surface active agents are mutually compatible and provide mixtures which form relatively stable aqueous solutions, which have comparable properties, when added to cement, to those of the sulphosuccinamates alone.

According to a further embodiment, therefore, our invention provides an air entraining composition comprising from 5 to 40% by weight of a sulphosuccinamate, from 5 to 40% of a sulphosuccinate and the balance of an alkyl benzene sulphonate.

The sulphosuccinamate may be any of those hereinbefore described and with the same preferences.

The sulphosuccinate may be any water soluble salt of an alkyl sulphosuccinate anion having the formula $$[SO_3 (C_2H_3) (CO_2)_2 R]^-$$

wherein R has the same significance as before. Preferably n has an average value of from 1 to 7 most preferably 3 to 7 e.g. 3 to 6. The cation may be any of those which are covered by the symbol M as used hereinbefore. It is usually convenient to employ a sulphosuccinate having the same cation and preferably the same alkyl group as the sulphosuccinamate.

Sulphosuccinates and sulphosuccinamates for use according to either embodiment of our invention are generally chosen from commercially available mixtures of alkyl, alkyl-alkoxy or alkylpolyalkoxy salts. In the most preferable materials the alkyl groups include at least 20% by weight of alkyl groups with 14 or more carbon atoms. Suitable mixed alcohols for use in providing the alkyl groups are mixtures comprising at least 20% by weight each, of alcohols having 12 to 14 carbon atoms respectively. Such mixtures are commercially available under the registered trade names Alfol 1012, Alfol 1214, and Alfol 1412 (sold by Conoco), Ethyl CO 1214 (Ethyl Corporation) Dobanol 23 and Dobanol 25 (Shell) and Laurex NC (Marchon Division of Albright & Wilson). Mixtures derived from higher alcohols, such as mixtures of predominantly C$_{16}$/C$_{18}$ alcohols may also be utilised. Thus the alkyl group may be derived from a wide range of alcohol precursors and may comprise for instance 20 to 90, 20 to 80, 20 to 70, 30 to 90, 30 to 80, 30 to 70, 40 to 90, 40 to 80 or 40 to 70% by weight of any of the linear or straight chain aliphatic alcohols having 10,11,12,13,1415,16,17,18,19 or 20 carbon atoms.

The alkyl benzene sulphonate for use according to the second embodiment of our invention, may be any water soluble salt of an alkylbenzene sulphonic acid wherein the alkyl group has from 8 to 22 carbon atoms. The preferred alkyl benzene sulphonates have from 10 to 14 e.g. 12 aliphatic carbon atoms. The salt is preferably a sodium salt, but may also be, for example, a potassium, lithium or ammonium salt, or an amine or alkanolamine salt.

The mixture preferably contains from 10 35% by weight of sulphosuccinate, and 10 to 35% by weight of sulphosuccinamate.

Our invention further provides aqueous solutions of the mixtures for example in concentrations of from 0.01% to saturation, preferably from 0.1 to 10% e.g. 1 to 7%.

Typically the dosage used in accordance with either embodiments of our invention may provide from 0.0001 to 10% of the sulphosuccinamate based on the weight of cement, preferably 0.01 to 1.0%, e.g. 0.012%. The sulphosuccinamates are preferably dissolved in the water used to form the mix, prior to mixing.

The entraining agents according to either embodiment of our invention are preferably used in substantially the same way as prior art air entraining agents for making cement, concrete, or mortar by techniques well known in the art. Usually the mixture comprises cement, sand and the aqueous solution of the entraining agent. The mixture usually contains a coarse aggregate and may optionally include lime. The proportions vary according to the type of product required. Suitable proportions are well known in the art. For example the proportion of cement to sand may be between 1:2 and 1:15 by weight, among the more commonly used mixes being 1:3 1:6 and 1:8. Some mortars contain proportions of cement to sand 1:9 or 1:12 by weight. The foregoing proportions are however not limitative and it may be that for some purposes proportions outside the foregoing ranges may be preferred.

In addition to cement and sand, most concrete mixes additionally contain coarse aggregates such as gravel. In each of the above specified mixes, at least a part of the sand may be replaced by gravel, or other inert fillers, to vary the properties of the concrete.

The invention is applicable to any of the cements used in the building industry which may be aerated, including Portland and hydraulic cements, especially masonry cement.

The cement and sand together with any gravel or lime are first thoroughly dry mixed and the water, containing the entraining agent is then added. Typically at least sufficient water is added to hydrate the cement. In the past it has been necessary to add a substantial excess of water in order to ensure a workable mix, with adverse consequences for the properties of the concrete. Use of air entraining agents enables a workable mixture to be obtained with relatively small excesses of water. The proportion can be varied within the wide limits, but it is preferred to employ the minimum amount which will provide a sufficiently workable mixture for the user's requirements. In a typical instance the amount of water may be about two-thirds the weight of cement. Normal mixing times are between 5 and 10 minutes, but a feature of our invention is that departure from normal mixing times is not critical.

The invention will be illustrated by the following examples:

EXAMPLE 1

600 gm Portland cement powder and 1650 gm sand were thoroughly mixed and a solution of ½ gm ammonium cocoyl sulphosuccinamate in 400 gm water was added.

The entrained air content rose rapidly to 17% after 10 minutes mixing and then more slowly to 24% after a further 10 minutes. Thereafter the amount of entrained air remained substantially constant. After a total of 60 minutes the air content was 26%. All percentages or air are expressed on a volume basis, measured by the method discribed in British Standard BS4887:1973.

EXAMPLE 2

A mortar was prepared by the method defined in British Standard 4551 (4.2) using 2800 gm sand comprising Grade A (2.36–1.18mm) (700 pts); Grade B (1.18mm 600μm)(700pts); Grade C (600–300μm) (700 pts); Grade D (300–150μm)(420 pts) and Grade E (150–90 μm) (280 pts), ordinary Portland Cement (O.P.C.)(800 gms) and water (416 gms) containing 0.24 gm (40% active matter) sodium oleyl sulphosuccinamate, representing the recommended dosage of 0.03% by weight on cement, so as to give the mortar a consistence (B.S.4551; 5.2) of 10.3 mm. After 2½ minutes mixing, the air content was determined by the density method, (B.S. 4551; 7.2) to be 15.6%. A second determination, after an additional four minutes gave an increase to only 18.4%. This performance falls well within the limits defined by B.S. 4887, in which the second determination shall not exceed a first determination of between 15 and 22%, by more than a figure of 7.

From a similar mortar mix standard cubes, of side 2¾ inches, were then prepared in the recommended manner BS 4551 (10.1) and after curing under water at 20° ± 0.5° C for periods of 7 and 28 days, the compressive strengths were determined. Averages of several strength determinations were found to be 97.5 kilo Newtons (7 days) and 123 kilo Newtons (28 days).

As a comparison, a mortar was similarly prepared as detailed in Example 2, in which the sulphosuccinamate air entraining agent was replaced by a commercially available natural resin based additive of a kind that has been widely tested and used for many years. A mortar was prepared from the same quantities of sand and cement as in Example 2 in which the recommended dosage of resin based air entraining agents was added in 435 mls water to give a consistence of 10.2 mm. The air contents were found to be 20.1 (2½ mins) and 29.4% (6½ mins), whilst compressive strength tests of cubes prepared as above were 80 kN (7 days) and 86 kN (28 days).

EXAMPLE 3

A mortar was prepared as described in Example 2, in which the air entraining agent was sodium tallow sulphosuccinamate. A dosage of 0.03% by weight on cement was used requiring 426 mls water to give a mortar of consistence 10.3 mm. Air contents were found to be 15.9% (first determination) and 18.3% (second determination). Compressive strengths determined on 2 3/4 inch cubes were 90 kN (7 days) and 119 kN (28 days).

EXAMPLE 4

A mortar was prepared by the method as described in Example 2, in which the air entraining agent was sodium cocoyl sulphosuccinamate. The recommended dosage of 0.03% by weight on cement together with 426 mls water were used to give the mortar a consistence of 10.1mm. Air contents were 18.1 (first determination) and 25.0 (second determination) after an additional four minutes mixing. Compressive strength determinations on 2¾ inch cubes averaged to 71 kN (7 days) and 82 (28 days).

EXAMPLE 5

Equal parts of a 30% active sodium neutralised mixed alkyl benzene sulphonate having an average of 12 aliphatic carbon atoms, disodium mixed lauryl/myristyl ethoxylated sulphosuccinate containing an average of 3 moles ethylene oxide per mole and sodium cocoyl sulphosuccinamate were mixed together to form a stable, water soluble mixture. An aqueous solution of 1 part of mixture to 19 parts water was prepared. The product was used as the air entraining agent in a mortar prepared as described in Example 2. The recommended dosage of 0.015% by weight on cement was added in 413 mls water to give the mortar a consistence of 9.5mm.

Air contents obtained as detailed in Example 2 were 16.1 (first determination) and 22.1% (second determination), after an additional four minutes mixing. Average compressive strength figures for cubes of side 2¾ inches cured as in Example 1 were 85 kN (7 days) and 103 kN (28 days).

In the foregoing examples 2 to 4 some limitations were imposed due to the relatively low solubility of the sulphosuccinamates in water. These problems were overcome using the compositions of Example 5.

For comparison, tests were performed using the following entraining agents, at a dose rate of 0.028%.

A. Sodium alkyl benzene sulphonate ($C_{16}$ average alkyl) alone. This performed unsatisfactorily giving % air entrained after 5 mins: 16.5, 10 mins: 19.0, 20 mins: 22.5, 60 mins:31.

B. A mixture of sodium alkyl benzene sulphonate and sodium cocoyl sulphosuccinamate. The mixture was unstable and tended to separate, although performance in the entraining test was satisfactory.

C. A mixture of sodium alkyl benzene sulphonate and disodium lauryl/myristyl 3 mole ethoxylated sulphosuccinate. The mixture did not perform acceptably.

What we claim is:

1. In the method of making cement based building materials which comprises agitating a mixture containing cement, water and an air entraining agent, and thereby entraining air in the said mixture, the improvement which consists in employing as said air entraining agent, a water soluble sulphosuccinamate salt, said sulphosuccinamate salt being selected from the group consisting of the sodium, potassium, lithium, ammonium, and amine salts of alkyl, alkenyl, alkylalkoxy, alkenyl alkoxy, alkyl polyalkoxy and alkenyl polyalkoxy sulphosuccinamates, wherein said alkyl and alkenyl moieties have from 8 to 22 carbon atoms, and which contain an average of from 0 to 20 alkylene oxide moieties.

2. The method according to claim 1 wherein said alkylene oxide moieties are selected from ethylene oxide and propylene oxide moieties.

3. An improved method according to claim 1 wherein said air entraining agent comprises from 5 to 40% by weight of said water soluble sulphosuccinamate salt, from 5 to 40% by weight of a water soluble sulphosuccinate salt and the balance consists essentially of a water soluble alkyl benzene sulphonate.

4. A method according to claim 3 wherein said sulphosuccinate is selected from the group consisting of the sodium, potassium, lithium, ammonium, and amine salts of alkyl, alkenyl, alkyl alkoxy, alkenyl alkoxy, alkyl polyalkoxy and alkenyl polyalkoxy sulphosuccinates, wherein said alkyl and alkenyl moieties have from 8 to 22 carbon atoms, and containing from 0 to 20 alkenyl oxide moieties selected from ethylene oxide and propylene oxide moieties.

5. A method according to claim 4 wherein said alkyl benzene sulphonate is selected from the group consisting of the water soluble sodium, potassium, lithium, ammonium, and amine salts of alkyl benzene sulphonic acids wherein said alkyl moiety contains from 8 to 22 carbon atoms.

6. A method according to claim 5 wherein said air entraining agent contains from 10 to 35% by weight of said sulphosuccinamate, from 0 to 35% by weight of said sulphosuccinate, the balance consisting essentially of said alkyl benzene sulphonate.

7. A composition for use as an air entraining agent containing from 5 to 40% of a water soluble sulphosuccinamate salt selected from the group consisting of sodium, potassium, lithium, ammonium, and amine salts of alkyl, alkenyl, alkyl alkoxy, alkenyl alkoxy, alkyl polyalkoxy and alkenyl polyalkoxy sulphosuccinamic acid, from 5 to 40% by weight of water soluble sulphosuccinate salt selected from the group consisting of the sodium, potassium, lithium, ammonium, and amine salts of alkyl, alkenyl, alkyl alkoxy, alkenyl alkoxy, alkyl polyalkoxy and alkenyl polyalkoxy sulphosuccinic acids, wherein each of said sulphosuccinamate and said sulphosuccinate contains from 0 to 20 alkylene oxide moieties selected from ethylene oxide moieties and propylene oxide moieties, the balance of said composition consisting essentially of a water soluble alkyl benzene sulphonate salt selected from the group consisting of the sodium, potassium, lithium, ammonium, and amine salts of an alkyl benzene sulphonic acid and wherein the alkyl moiety of each of said salts has from 8 to 22 carbon atoms.

8. An aqueous solution consisting essentially of water and from 0.01% to saturation of a composition as claimed in claim 7.

9. The composition of claim 7 wherein at least one of said salts is an alkanolamine salt.

10. The method of claim 1 wherein said salt is an alkanolamine salt.

11. The method of claim 5 wherein at least one of said salts is an alkanolamine salt.

* * * * *